Dec. 16, 1924.
E. C. SMITH
1,519,340
CONVERTIBLE MANURE SPREADER BOTTOM
Filed March 26, 1920
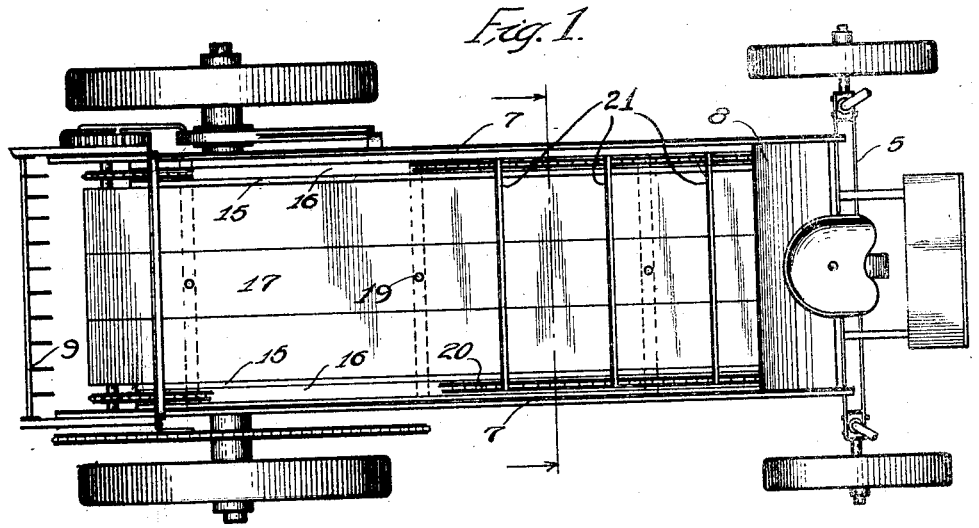
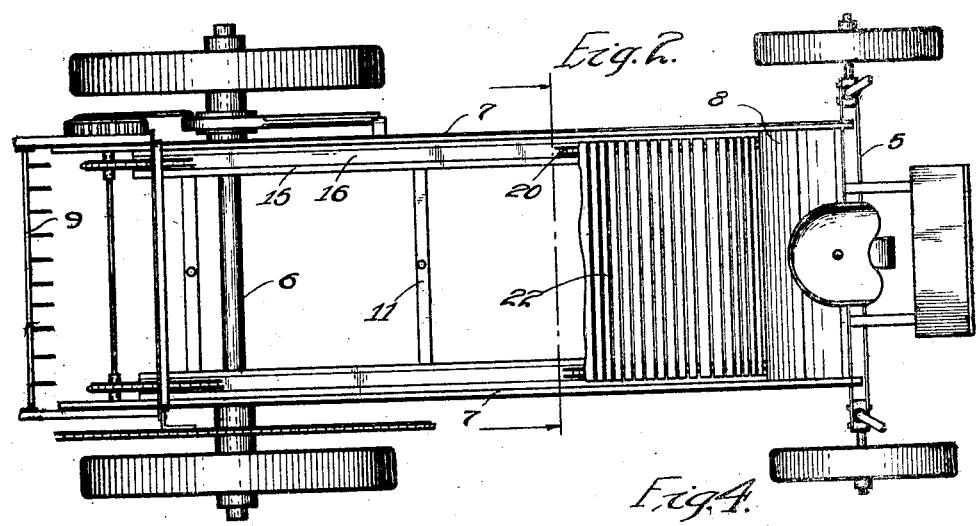
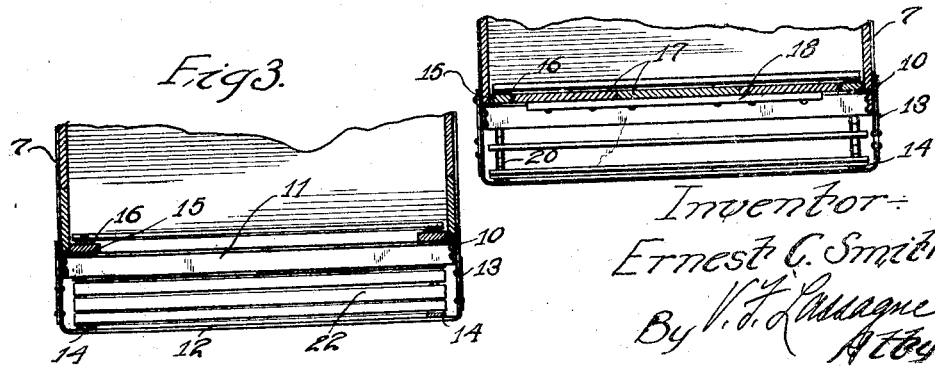
Inventor:
Ernest C. Smith Patented Dec. 16, 1924.

1,519,340

UNITED STATES PATENT OFFICE.

ERNEST C. SMITH, OF CHICAGO, ILLINOIS, ASSIGNOR TO INTERNATIONAL HARVESTER COMPANY, A CORPORATION OF NEW JERSEY.

CONVERTIBLE MANURE-SPREADER BOTTOM.

Application filed March 26, 1920. Serial No. 369,076.

*To all whom it may concern:*

Be it known that I, ERNEST C. SMITH, a citizen of the United States, residing at Chicago, in the county of Cook and State of Illinois, have invented certain new and useful Improvements in Convertible Manure-Spreader Bottoms, of which the following is a full, clear, and exact specification.

This invention relates to manure spreaders, and its object is to provide a wagon box or body for spreaders so constructed as to permit the machine to be readily converted from the solid or closed bottom type, using a conveyor comprising chains carrying spaced cross-bars, to the open bottom type using a conveyor in the form of a slatted apron, or vice versa.

I accomplish this by constructing the machine with a box or body having a wide central panel, which is attached to the frame by easily removable connections, and mounting this panel between permanent narrow side panels or sections carrying metal tracks on which either the conveyor or apron travel, the conveyor and apron being interchangeable.

With this and other objects in view, the invention consists of the organization and details of construction, or their equivalents, hereinafter described and defined in the claim.

Referring to the drawings:

Fig. 1 is a plan view of a spreader with the central panel in place, and showing a portion of the conveyor;

Fig. 2 is a plan view of a spreader with the panel removed, and showing a portion of the slatted apron;

Fig. 3 is a transverse section through the middle of Fig. 1; and

Fig. 4 is a transverse section through the middle of Fig. 2, both looking in the direction of the arrows.

The invention is illustrated in connection with a manure spreader including the front tongue truck 5 and rear wheeled axle 6, with which is associated the driving mechanism for the apron and beater in the usual manner.

The box or body, including the novel structure of my invention, comprises the sides 7 and sloping front end 8, the rear end being closed by the usual beater 9. This box rests on the frame of the machine, which is preferably constructed of angle iron, and includes the side members 10 (Figs. 3 and 4) and spaced cross members 11.

Beneath the body at intervals transverse guiding and supporting elements 12 are suspended by vertical straps 13 from the side members of the frame, and these transverse elements carry longitudinal straps shown in cross section at 14 (Figs. 3 and 4), on which the lower run of the conveyor or apron, as the case may be, travels.

The bottom of the box or body is composed of narrow side panels or sections 15, permanently secured to the longitudinal frame bars 10, in contact with the sides 7, and carrying the longitudinally extending track 16. Between these narrow sections a single wide panel 17, which may be formed of several boards connected by cleats 18 (Fig. 4), is placed and detachably secured, as by screws or bolts at 19, to the cross members 11 of the frame. The tracks 16 serve to support the chains 20 of the traveling element that feeds the material to the rear of the body, and this element may be either the conveyor having the spaced cross bars 21, as seen in Fig. 1, or the apron having the closely placed slats 22 (Fig. 2), both the conveyor and apron being provided with chains having detachable links to permit removal of one and substitution of the other.

It follows from the construction above described that a spreader embodying it can be readily adjusted to operate efficiently on the different kinds of manure ordinarily used, whether coarse, fine, wet or dry. The change from the solid bottom with conveyor to the open bottom with slatted apron, as in Figs. 1 and 2 respectively, being easily accomplished by removal of the conveyor and detachable central panel, and substitution of the slatted apron, or the reverse. Both types of machines are thus combined in one.

What I claim as my invention is:

In a manure spreader, a supporting frame including side members and spaced transverse members, a body supported on said frame and including side walls having narrow bottom strips fixed at each inner side thereof, conveyor tracks on said strips, a unitary bottom panel supported on said transverse members and closing the space between said strips, removable fastening elements securing said panel to the transverse members, and an endless conveyor having an upper run traveling above and out of contact with the bottom panel and having chains at its edges resting on said tracks and supporting the conveyor independently of the bottom panel.

In testimony whereof I affix my signature.

ERNEST C. SMITH.